United States Patent
Amandi

(10) Patent No.: US 6,667,979 B1
(45) Date of Patent: Dec. 23, 2003

(54) METHOD AND MODULE FOR PROCESSING ATM CELLS IN BIDIRECTIONAL DATA STREAMS

(75) Inventor: Dirk Amandi, München (DE)

(73) Assignee: Siemens Aktiengesellscahft, Münich (DE)

( * ) Notice: Subject to any disclaimer, the term of this patent is extended or adjusted under 35 U.S.C. 154(b) by 0 days.

(21) Appl. No.: 09/462,215

(22) PCT Filed: Jul. 2, 1998

(86) PCT No.: PCT/DE98/01835

§ 371 (c)(1),
(2), (4) Date: Jan. 4, 2000

(87) PCT Pub. No.: WO99/01954

PCT Pub. Date: Jan. 14, 1999

(30) Foreign Application Priority Data

Jul. 4, 1997 (DE) .......................................... 197 28 690

(51) Int. Cl.[7] .............................................. H04L 12/56
(52) U.S. Cl. ................................. 370/395.1; 370/236.2
(58) Field of Search ............................. 370/395.1, 396, 370/395.42, 236.2, 241.1

(56) References Cited

U.S. PATENT DOCUMENTS 5,956,337 A * 9/1999 Gaddis ........................ 370/395

FOREIGN PATENT DOCUMENTS

| DE | 42 12 394 | 10/1992 |
|---|---|---|
| EP | 0 814 631 | 12/1997 |
| WO | WO 97/13377 | 4/1997 |

OTHER PUBLICATIONS

S. Nishimura, et al., "Asynchronous Transfer Mode Network for Broadband ISDN", Hitachi Review, vol. 43, No. 2, Apr. 1994, pp. 47–52.
R. Handel, et al., "ATM Networks, Concepts, Protocols, Applications", 2d Ed., Addison–Wesley, pp. 58–98, 1994.

* cited by examiner

Primary Examiner—Kenneth Vanderpuye
(74) Attorney, Agent, or Firm—Schiff Hardin & Waite

(57) ABSTRACT

For processing ATM cells in bidirectional, upstream and downstream data streams in an ATM module, whereby the processing speed is higher than the average cell rate and empty cycles without ATM cells occur in the cell stream, a processing logic of the module—for the purpose of an alternating processing of upstream or downstream cells—makes requests upstream and downstream for empty cycles to an empty cycle controller in order to receive processing time. The cells of the downstream data stream can be separately backed up and released in a buffer and, in this way, downstream empty cycles can be generated. Given a downstream empty cycle request, this request is allowed with priority over a simultaneous downstream request when an empty cycle occurs, and, given a downstream empty cycle request, an empty cycle is released delayed by one cycle length if an upstream request is simultaneously present but is otherwise immediately released.

4 Claims, 3 Drawing Sheets

METHOD AND MODULE FOR PROCESSING ATM CELLS IN BIDIRECTIONAL DATA STREAMS

BACKGROUND OF THE INVENTION

The present invention is directed to a method for processing ATM cells in bidirectional modules processing upstream and downstream data streams in messages, whereby the processing speed is higher than the average cell rate and empty cycles without ATM cells occur in the cell stream.

The present invention is also directed to a module for processing ATM cells in bidirectional, upstream and downstream data streams, for example an OAM module, having inputs and outputs and interfaces for the upstream and the downstream data stream, having an upstream cell processing unit and having a downstream cell processing unit as well as having a processing logic.

ATM, the abbreviation for "Asynchronous Transfer Mode", is a network technology that is suitable for the transport of all known signal data such as pure data, voice and video data, etc., whereby the designation ATM is occasionally employed as a synonym for B-ISDN (Broadband Integrated Services Digital Network). A structuring into cells of equal length is characteristic of ATM. The information to be communicated is divided onto ATM cells, namely into packets of 53 bytes, that carry a cell header of 5 bytes and payload information of 48 bytes. The header information thereby identifies a specific virtual connection. By contrast to traditional time-division multiplex methods, wherein time slots are allocated in advance to various types of data traffic, the data traffic incoming at an ATM interface is segmented into said 53-byte cells, and these cells are sequentially forwarded as they were generated. Further details regarding ATM can be derived from the literature. See for example: "ATM-Networks, Concepts, Protocols and Applications", Handel, Huber and Schroder, Addison-Wesley-Longman, Second Edition, 1994 (ISBN 0-201-42274-3).

Highly integrated circuits in ASIC modules are employed for processing ATM cells. OAM cells are one example, these being utilized for the administration and processing of the OAM streams (OAM=Operation Administration and Maintenance). OAM modules or other cell processing modules are utilized, for example, between network matching units and a switching network module or other modules. FIG. 1 is referenced with respect thereto, this showing a possible architecture. Physical layer modules PHY can be seen at the left and right in the figure, these enabling the transition from a transport network, for example STM1, onto ATM. The dot-dashed lines at the left and right symbolize the boundaries between the physical layer Phy.L and the ATM layer ATM-L. ATM modules BST are provided symmetrically relative to a switching network module SWI, these lying between the switching network module SWI and the physical layer modules PHY. Dependent on the demands and conditions, one or more ATM modules BST can be present. In order to indicate this, a respective ATM module is shown with broken lines.

As can be derived from the block circuit diagram according to FIG. 1, which is relevant both for the prior art as well as for the invention, bidirectional data streams are processed, these being referenced UP for upstream and DOWM for downstream. The designations upstream and downstream indicate the direction "up to" the switching network or, "down from" the switching network given switching networks. Basically, the designations of the two data streams as UP and DOWN, however, are arbitrary and interchangeable with one another.

Separate ATM modules can be employed for the processing of the cells of the two data streams or—as shown in FIG. 1, both data streams can be processed in one ATM module. This is the relevant case here. In the prior art, the gate logic required for the cell processing is thereby doubly implemented in order, namely, to be able to process each of the two data streams.

It is object of the invention to provide a savings in terms of hardware, namely in terms of gate area of the modules, given employment of ATM modules for bidirectional data streams.

SUMMARY OF THE INVENTION

This object is inventively achieved in accordance with the present invention in a method for processing ATM cells in bidirectional, upstream and downstream data streams in messages, wherein the processing is performed in modules each having a processing logic at a processing speed higher than an average cell rate, the upstream and downstream data streams having occurrences of empty cycles without ATM cells, in that the processing logic of the module—for the purpose of an alternating processing of upstream or, downstream cells—makes upstream and downstream demands for empty cells in order to obtain processing time, the cells of the downstream data stream can be separately backed up and released and, in this way, downstream empty cells can be generated, whereby, given an upstream empty cycle demand in the case of a empty cycle that has occurred, this demand is allowed with priority over a simultaneous downstream demand, and, given a downstream empty cycle demand, a empty cycle is released delayed by a cycle length if an upstream demand is simultaneously present, but is otherwise immediately released.

The object is likewise achieved in accordance with the present invention in a module having a processing logic for processing ATM cells in bidirectional, upstream and downstream data streams in messages, wherein the processing is performed at a processing speed higher than an average cell rate, the upstream and downstream data streams having occurrences of empty cycles without ATM cells, whereby, according to the invention, an empty cycle controller is provided, the processing logic is configured—for the purpose of an alternating processing of upstream or, respectively, downstream cells—to send requests for empty cycles to the empty cycle controller, the downstream entry interface is configured to backup and release the cells of the data stream in controlled fashion and, in this way, to generate downstream empty cycles, and the empty cycle controller, which is provided by the entry interface of the upstream data stream with information about occurring upstream empty cycles, is configured, given an upstream empty cycle request, to allow this request with priority over a simultaneous downstream request when an empty cycle occurs, to send an instruction—given a downstream empty cycle request—to the downstream entry interface for a release delayed by a cycle length when an upstream empty cycle request is simultaneously present but otherwise a command for immediate release.

The present invention utilizes the fact that empty cells having a statistical source occur in ATM systems. Given involvement of a switching network, this is the case in the cell stream UP, namely due to an elevated bit rate, since ATM cells are processed faster in an ATM module than the resupply of ATM cells. There is thus a probability dependent on the input bit rate and on the processing speed in the module that no ATM cell will be located in an input buffer for one of the two cell streams. In the other cell stream—always the "downstream" cell stream DOWM, for example, below empty cells are actively generated as a result of the backing up of the ATM cells defined by the module, in that no ATM cell is allowed downstream in the input buffer, so that a cell gap, i.e. an empty cell, arises. As a result thereof and by coordinating the empty cells upstream or, downstream, many functions can be processed upstream or, downstream by a single logic in alternation in the cell stream, so that these logic parts need be implemented only once in a module and gate area is saved.

It is expedient when selected functions such as, for example, "internal RAM update", are processed in alternation during empty cycles.

Particularly when access to external buffers is difficult, it can be expedient when a backup buffer for the downstream data stream is provided preceding the downstream processing unit, this being controllable by the processing logic via the empty cycle controller.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
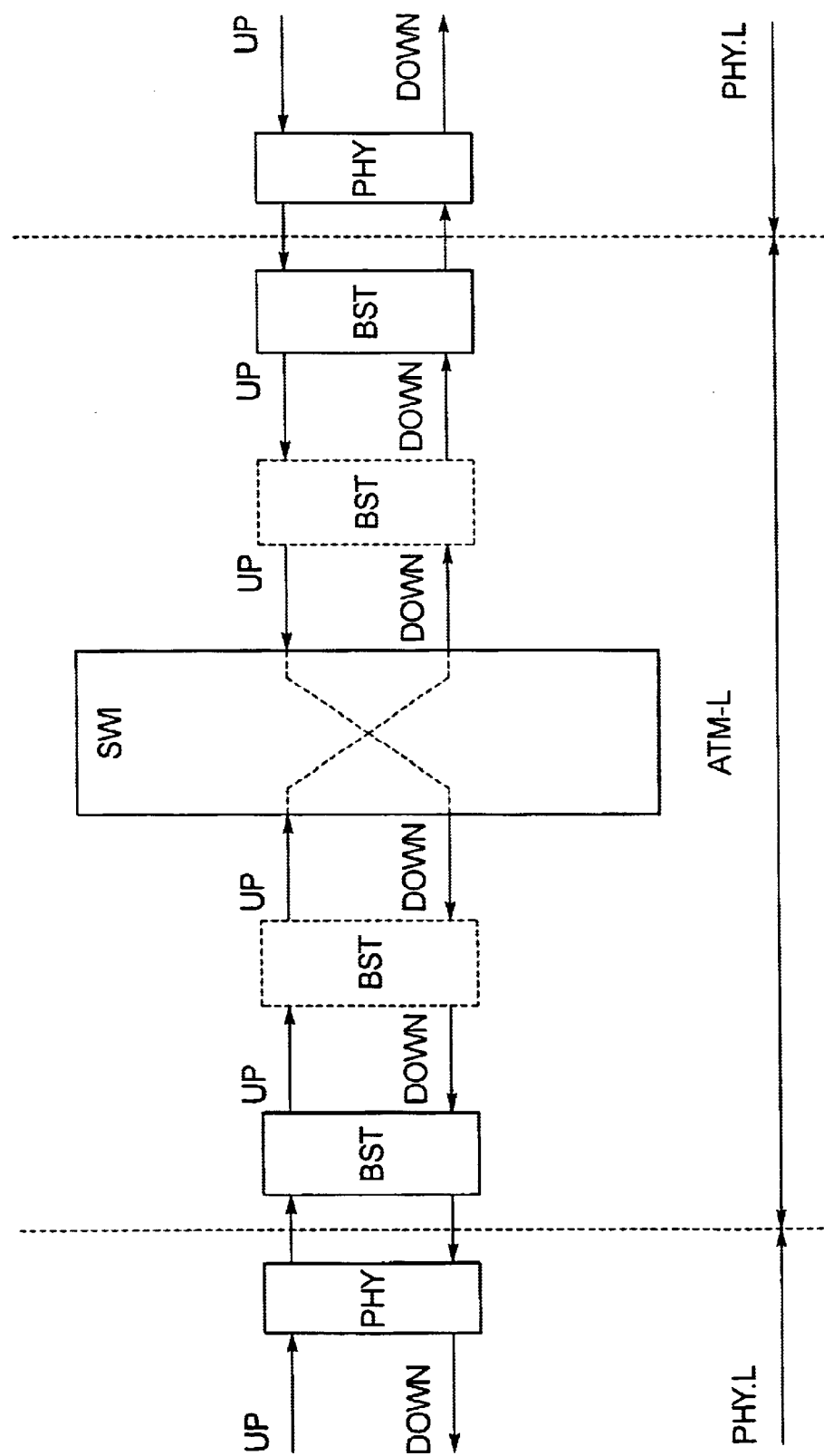
FIG. 1 is a block circuit diagram of a general ATM structure with a switching network module.
Figure 2:
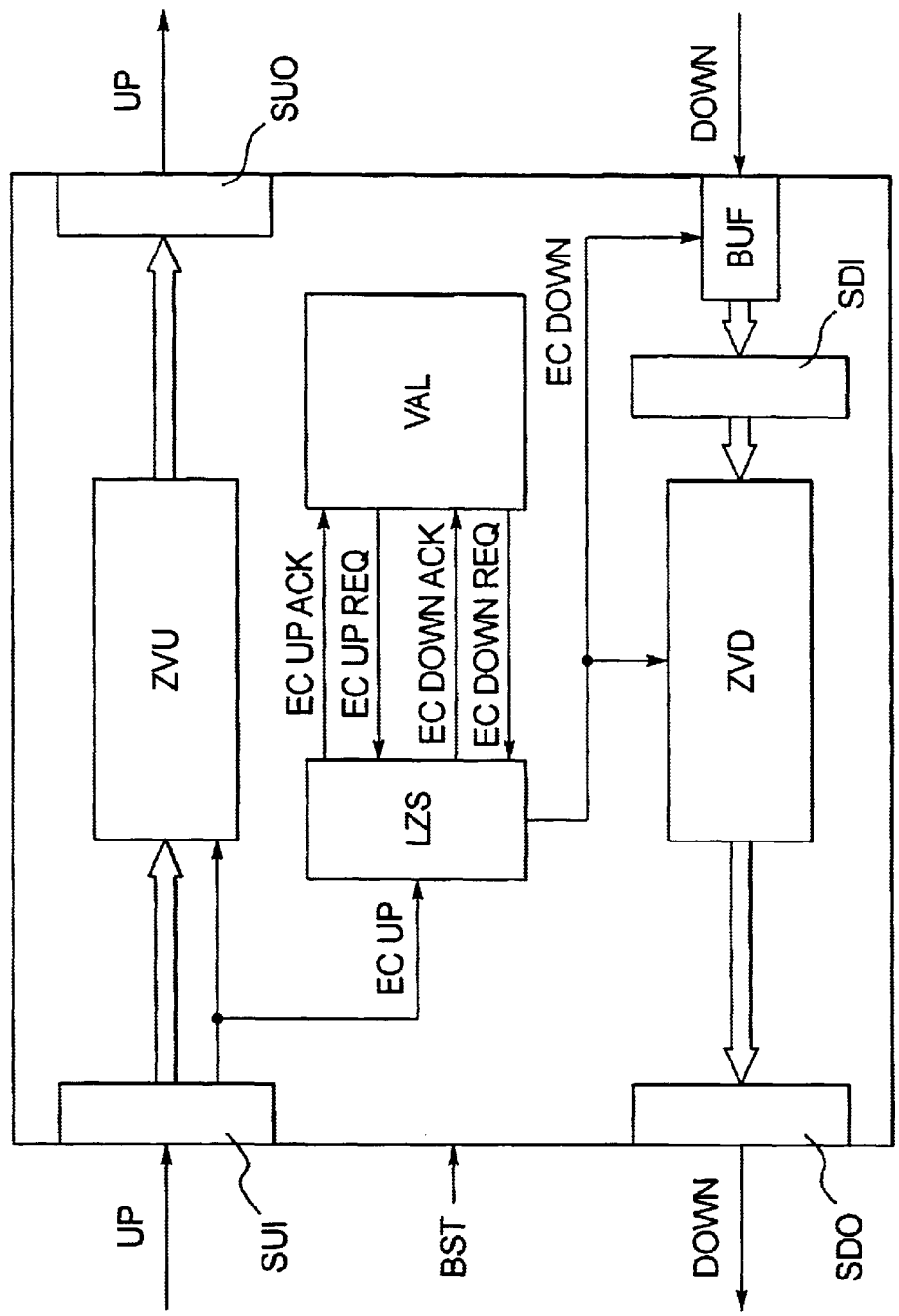
FIG. 2 is a block circuit diagram of a module constructed and operated in accordance with the present invention.

FIG. 1 was already referenced at the outset in conjunction with an exemplary ATM structure. FIG. 2 then shows one of the ATM modules BST shown in FIG. 1. The module BST is configured for processing bidirectional data streams, namely a data stream UP and a data stream DOWN, whereby the input or, output interface for the data stream UP is referenced SUI or respectively SUO, and the input or output interface for the data stream DOWN is referenced SDI or SDO. The input interface SDI of the "downstream" data stream DOWN has a controllable, internal buffer BUF allocated to it in this embodiment; however, it should be pointed out that such buffers, which can back up cells, are usually available outside the module BST.

Further, the module BST has an upstream cell processing unit ZVU as well as a downstream cell processing unit ZVD. Such a cell processing unit has a buffer function; by analogy it forms a "workbench" on which the retained cell can be processed. These processing units ZVU, ZVD serve the purpose of cell processing in view of all jobs that are to be implemented simultaneously and clocked.

The module BST also contains a processing logic VAL for those jobs of cell processing that are not bound in time to simultaneous cell processing. The cell processing is quite generally triggered by a cell processing start signal that fundamentally corresponds to the signal "empty cycle occurred", i.e. "no cell occurred", and that comes upstream from the interface SUI. The processing logic VAL is in communication with an empty cycle controller LZS that in turn receives signals about the presence of empty cells in the upstream cell stream UP from the upstream input interface SUI and, on the other hand, can deliver control signals to the downstream cell processing unit ZVD as well as to the internal backup buffer BUF or to an external buffer. This is explained in greater detail below.

It is assumed below that the processing of the cells after the interface SUI of the upstream cell stream UP ensues faster than cells are resupplied. This assumption is indispensable, on the one hand, for the functioning of a cell processing because, given the contrary case, a cell backup with memory overflow and cell loss would occur and, on the other hand, it results in the occurrence of cell gaps or empty cycles having a length corresponding to the respective cell length.

The statistically occurring empty cycles in the cell stream UP are not influenced; rather, they are accepted or employed as they occur. They are, so to speak, assigned a priority. By contrast thereto, empty cycles in the downstream cell stream DOWN are activated by the module. This ensues by the backup of the ATM cells defined by the module. When the buffer BUF—or, alternatively, the input interface SDI of the downstream cell stream DOWM—receives a command to block the cell stream for a cell length, an empty cell occurs as a result.

The logic VAL is then configured, in conformity with the pending processing jobs, to make empty cycle demands upstream or downstream of the empty cycle controller LZS, this being indicated in FIG. 2 with the arrows "EC up Req" or "EC down Req". The occurrence of empty cycles in the upstream cell stream UP is thereby reported from the input interface SUI to the empty cycle controller LZS with a signal "EC up". The command for empty cycle generation downstream, referenced "EC down" in FIG. 2, proceeds from the empty cycle controller LZS to the backup buffer BUF. Corresponding messages, of course, also proceed to the two cell processing units ZVU and ZVD. The empty cell controller LZS sends acknowledgment signals "EC up Ack" and "EC down Ack" to the processing logic VAL that serves for the alternating cell processing upstream and downstream. The module is also fundamentally additionally configured for a simultaneous processing of the cells upstream and downstream in view of functions that require such a processing or it could contain what is referred to as a "cross channel" in order to reroute cells from data stream into the other; details about this, however, are not required since they do not affect the invention. What is critical here is that jobs are implemented in the empty cycles that are not bound in terms of time to the simultaneous and clocked cell processing.

As already mentioned, an empty cycle request upstream is allowed insofar as an empty cycle has statistically occurred upstream. There is an exception when a downstream empty cycle request already pending was delayed due to the upstream empty cycle request that has higher priority. The empty cell request downstream is delayed maximally by the length of one empty cell, i.e. the downstream empty cycle is actively generated no later than one such cell length following the request. In this special case, an empty cycle upstream that could at most again be present is "given away".

This procedure is necessary since, given a high plurality of empty cycles occurring upstream, for example given a low cell rate at the input upstream, the empty cell requests downstream would otherwise be delayed unnecessarily long and, in the extreme case when, namely, the cell rate at the upstream input is zero, could not be implemented at all.

If there is no conflict between empty cycle requests upstream and downstream, the empty cycle request upstream is allowed as soon as a statistically empty cycle occurs upstream. The empty cell request downstream is immediately allowed, since the empty cycle downstream can be activated in the module itself.

Figure 3:
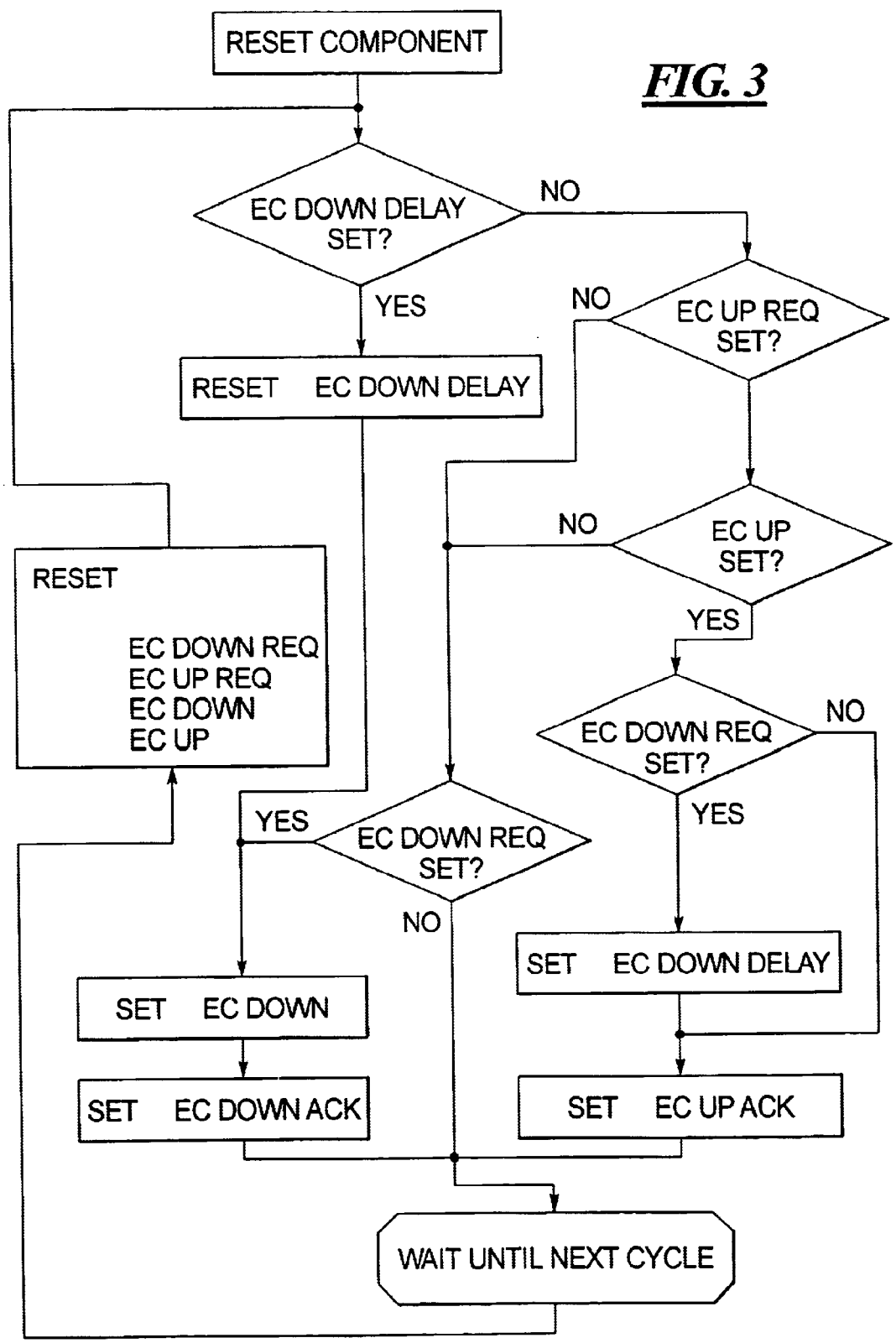
FIG. 3 shows an example of a flowchart for the implementation of the method of the present invention.

The method explained above with reference to the presentation of the module BST is explained again by the flowchart of FIG. 3. In this flowchart, the above-described instances can be logically seen, for example the delay of a downstream empty cycle, referenced "EC down delay" in the flowchart. The designation EC (empty cycle) is consistently employed for "empty cycle" in the flowchart and the abbreviation Req stands for "request". Moreover, the flowchart is self-explanatory, so that no further explanation is required.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. A method for processing ATM cells in bidirectional, upstream and downstream data streams in messages, wherein said processing is performed in modules each having a processing logic at a processing speed higher than an average cell rate, said upstream and downstream data streams having occurrences of empty cycles without ATM cells, said method comprising the steps of:

alternating processing of cells of said upstream and downstream data streams by making upstream and downstream requests for empty cycles in order to receive a processing time;

generating downstream empty cycles by separately backing up and releasing cells of said downstream data stream;

allowing an upstream empty cycle request with priority over a simultaneous downstream empty cycle request given an occurring upstream empty cycle;

releasing a downstream empty cycle delayed by a cycle length given a downstream empty cycle request and a simultaneous upstream empty cycle request and no occurring upstream empty cycle; and releasing a downstream empty cycle immediately given a downstream empty cycle request and no simultaneous upstream empty cycle request.

2. The method according to claim 1, wherein selected functions are processed in alternation during upstream and downstream empty cycles.

3. A module for processing ATM cells in bidirectional, upstream and downstream data streams, said module comprising:

an upstream input interface for receiving said upstream data stream, said upstream input interface outputting information about occurring upstream empty cycles;

a downstream input interface for receiving said downstream data stream, said downstream input interface for delaying and releasing cells of said downstream data stream in a controlled fashion and for thereby generating downstream empty cycles;

an upstream output interface for outputting said upstream data stream;

a downstream output interface for outputting said downstream data stream;

an upstream cell processing unit connected between said upstream input interface and said upstream output interface;

a downstream cell processing unit connected between said downstream input interface and said downstream output interface;

a processing logic for alternating processing of upstream cells and downstream cells and for outputting upstream empty cycle requests and downstream empty cycle requests; and an empty cell controller for receiving information about occurring upstream empty cycles from said upstream input interface and for receiving upstream empty cycle requests and downstream empty cycle requests from said processing logic, said empty cell controller allowing with priority a received upstream empty cycle request over a simultaneously received downstream empty cycle request given an occurring upstream empty cycle, said empty cell controller sending to said downstream input interface a command for a release delayed by a cycle length given a downstream empty cycle request and a simultaneous upstream empty cycle request and no occurring upstream empty cycle, said empty cell controller sending to said downstream input interface a command for immediate release given a downstream empty cycle request and not a simultaneous upstream empty cycle request.

4. The module according to claim 3, further comprising:

a backup buffer preceding said downstream cell processing unit and for buffering said downstream data stream, said backup buffer being controlled by said processing logic via said empty cycle controller.

* * * * *